United States Patent
Zhang et al.

(10) Patent No.: US 12,434,177 B2
(45) Date of Patent: Oct. 7, 2025

(54) ELECTROSTATICALLY CONDUCTIVE FILTER ELEMENT AND FUEL FILTER

(71) Applicant: ZHEJIANG LAIEN FILTRATION SYSTEM CO., LTD., Huzhou (CN)

(72) Inventors: Yu Zhang, Huzhou (CN); Xiaowei Ying, Huzhou (CN); Jianbin Cheng, Huzhou (CN); Qinglin Deng, Huzhou (CN)

(73) Assignee: ZHEJIANG LAIEN FILTRATION SYSTEM CO., LTD., Huzhou (CN)

( * ) Notice: Subject to any disclaimer, the term of this patent is extended or adjusted under 35 U.S.C. 154(b) by 383 days.

(21) Appl. No.: 17/962,658

(22) Filed: Oct. 10, 2022

(65) Prior Publication Data

US 2024/0082758 A1    Mar. 14, 2024

(30) Foreign Application Priority Data

Sep. 9, 2022    (CN) .......................... 202211095145.5

(51) Int. Cl.
| | | |
|---|---|---|
| *B01D 35/06* | (2006.01) | |
| *B01D 35/00* | (2006.01) | |
| *B01D 35/30* | (2006.01) | |

(52) U.S. Cl.
CPC ........... *B01D 35/06* (2013.01); *B01D 35/005* (2013.01); *B01D 35/30* (2013.01); *B01D 2201/306* (2013.01); *B01D 2201/50* (2013.01); *B01D 2247/02* (2013.01); *B01D 2257/80* (2013.01)

(58) Field of Classification Search
CPC ...... B01D 35/06; B01D 35/005; B01D 35/30; B01D 2201/306; B01D 2201/50; B01D 2247/02; B01D 2257/80; B01D 35/26; B01D 35/02; F02M 37/34
See application file for complete search history.

(56) References Cited

U.S. PATENT DOCUMENTS

| | | | |
|---|---|---|---|
| 8,431,023 B2 | 4/2013 | Berland et al. | |
| 2002/0144938 A1* | 10/2002 | Hawkins | B01D 29/96 |
| | | | 210/243 |

FOREIGN PATENT DOCUMENTS

| | | | | |
|---|---|---|---|---|
| CN | 110772874 A | * | 2/2020 | ............. B01D 35/30 |
| FR | 2929858 A1 | * | 10/2009 | ............. B01D 29/21 |
| WO | WO-2012085193 A1 | * | 6/2012 | ........... B01D 27/103 |

* cited by examiner

*Primary Examiner* — Waqaas Ali
(74) *Attorney, Agent, or Firm* — Ladas & Parry LLP

(57) ABSTRACT

The present application discloses an electrostatically conductive filter element. An annular end cover made of a conductive material is connected to one end of a filter medium of the filter element. An annular raised wall axially extends from an inner opening of the annular end cover. Conductive portions radially extending inwards and configured to be in hard connection with an external conductive device are arranged on an inner surface of the annular raised wall. During use of this filter element, the conductive portions can be stably electrically connected to the external conductive device, and the static electricity generated by the filter medium is dissipated to the outside by the external conductive device.

7 Claims, 2 Drawing Sheets

ELECTROSTATICALLY CONDUCTIVE FILTER ELEMENT AND FUEL FILTER

CROSS REFERENCE TO RELATER APPLICATION

This application claims priority to Chinese Patent Application No. 202211095145.5, filed on Sep. 9, 2022, the disclosure of which is incorporated by reference in its entirety.

FIELD OF TECHNOLOGY

The present application relates to the technical field of filtration, in particular to an electrostatically conductive filter element and a fuel filter.

BACKGROUND

A fuel filter functions to filter fuel (gasoline or diesel) required for the combustion in an engine to prevent foreign matter such as dust, metal powder, moisture, organic matter, etc. in the fuel from entering the engine to cause engine wear or blockage of a fuel supply system. When fuel flows in a filter, the friction of a fluid as it passes through a filter medium will lead to the loss of electrons, and these electrons will be gathered on a filter element to generate a large amount of static charge; and when the static charge is accumulated to a certain degree, spark discharge may occur to break down the filter element or a fuel filter housing to cause fuel leakage, local instantaneous high temperature of fuel, and even combustion accidents.

An existing fuel filter often prevents the accumulation of static electricity on a filter material by means of an anti-static filter material or conducts out static electricity by means of a complex electrical connection structure, but the generation of static electricity cannot be simply and effectively eliminated. For example, it is proposed in the U.S. Pat. No. 8,431,023B2 that an elastic lug is arranged at a flange, the elastic lug is in contact and electrical connection with an electrical device, and static electricity is conducted out via a ground wire on the electrical device. However, when the elastic lug is soaked in fuel for a long time, it will lead to the failure of elastic deformation, and bad contact is easily caused between the elastic lug and the electrical device to affect the release of static electricity.

SUMMARY

In order to solve the technical problem that static electricity generated in an existing fuel filter cannot be effectively released for a long time, a main objective of the present application is to provide an electrostatically conductive filter element and a fuel filter.

In order to achieve the above objective, the present application provides an electrostatically conductive filter element, including a filter element frame and a filter medium sleeved on the periphery of the filter element frame, where an annular end cover made of a conductive material is connected to one end of the filter medium, and a base is connected to the other end of the filter medium; an annular raised wall axially extends from an inner opening of the annular end cover; and conductive portions radially extending inwards and configured to be in hard connection with an external conductive device are arranged on an inner surface of the annular raised wall.

Optionally, each of the conductive portions is provided with a contact surface matched with the external conductive device.

Optionally, the conductive portion and the external conductive device are in interference and close fit and are in surface connection.

Optionally, the conductive portion is in a "U" or "V" shape.

Optionally, there are at least two conductive portions.

Optionally, the filter element frame is provided with a plurality of helical ribs, and a channel for a fluid to flow is provided between the ribs.

Optionally, the filter element frame is provided with a water-blocking filter membrane, and the water-blocking filter membrane is integrally injection-molded together with the filter element frame and configured to separate water in fuel.

Optionally, the base is formed with leak holes, and the leak holes communicate with a channel between the filter medium and the water-blocking filter membrane to leak separated water.

Optionally, two end surfaces of the filter medium are integrally welded with the annular end cover and the base, respectively.

The present application further provides a fuel filter, including:

the electrostatically conductive filter element as described above; and an external conductive device including a housing and a pump device installed in the housing, the electrostatically conductive filter element being arranged in the housing, the pump device being arranged in a filter element frame and being in hard contact with conductive portions, and the pump device being provided with an electrical connector to conduct out the static electricity generated in a filter medium by a fluid.

In the technical solution of the present application, the filter medium is electrically connected to the annular end cover made of the conductive material, and the conductive portions are arranged on the annular raised wall of the annular end cover and are in hard contact with the external conductive device. This hard connection can enable the conductive portions to be stably electrically connected to the external conductive device, and the static electricity is conducted out by the external conductive device and dissipated to the outside, such that the static electricity generated by the filter medium can be effectively released for a long time during use of the filter element.

BRIEF DESCRIPTION OF THE DRAWINGS

In order to more clearly illustrate the embodiments of the present application or the technical solution in the prior art, the accompanying drawings that need to be used in the description of the embodiments or the prior art will be briefly introduced below. Apparently, the accompanying drawings in the description below merely illustrate some embodiments of the present application. Those of ordinary skill in the art may also derive other accompanying drawings from structures shown in these accompanying drawings without creative efforts.

In the figures.

Figure 1:
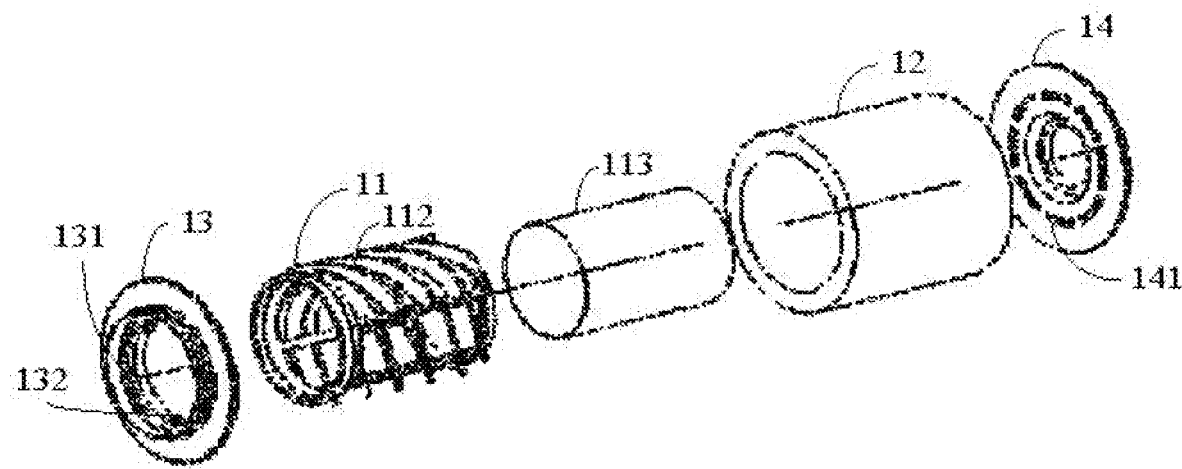
FIG. 1 is an exploded view of an embodiment of an electrostatically conductive filter element provided by the present application.

100: electrostatically conductive filter element; 11: filter element frame; 112: rib; 113: water-blocking filter membrane; 12: filter medium; 13: annular end cover; 131: annular raised wall; 132: conductive portion; 132a: contact surface; 14: base; and 141: leak hole.

The objective achievement, functional characteristics, and advantages of the present application will be further illustrated with reference to the accompanying drawings in conjunction with the embodiments.

DETAILED DESCRIPTION

The technical solutions in the embodiments of the present application are clearly and completely described below with reference to the accompanying drawings in the embodiments of the present application. Apparently, the described embodiments are merely a part rather than all of the embodiments of the present application. All other embodiments obtained by those of ordinary skill in the art based on the embodiments of the present application without creative efforts shall fall within the scope of protection of the present application.

In order to better describe and illustrate the embodiments of the present application, one or more accompanying drawings may be referred to, but additional details or examples used to describe the accompanying drawings should not be considered to limit the scope of any one of creations, presently described embodiments, or preferred modes of the present application.

In the description of the present application, it should be noted that the orientational or positional relationships indicated by the terms "length", "width", "upper", "lower", "front", "back", "left", "right", "top", "bottom", "inside", "outside", etc. are based on the positional relationships shown in the accompanying drawings, are only used for the convenience of describing the present application rather than indicating that the referred device must have a specific orientation or be operated in a specific orientation, and therefore should not be construed as a limitation to the present application.

All technical and scientific terms used herein have the same meaning as commonly understood by those skilled in the art of the present application, unless otherwise defined. The terms used in the specification of the present application are only used for describing specific embodiments, and are not intended to limit the present application.

An existing fuel filter often prevents the accumulation of static electricity on a filter material by means of an anti-static filter material or conducts out static electricity by means of a complex electrical connection structure, but the generation of static electricity cannot be simply and effectively eliminated. For example, it is proposed in the U.S. Pat. No. 8,431,023B2 that an elastic lug is arranged at a flange, the elastic lug is in contact and electrical connection with an electrical device, and static electricity is conducted out via a ground wire on the electrical device. However, when the elastic lug is soaked in fuel for a long time, it will lead to the failure of elastic deformation, and bad contact is easily caused between the elastic lug and the electrical device to affect the release of static electricity.

In view of this, the present application provides an electrostatically conductive filter element. FIGS. 1 to 4 show an embodiment of the electrostatically conductive filter element provided by the present application. Referring to FIG. 1, the filter element 100 capable of conducting static electricity includes a filter element frame 11 and a filter medium 12 sleeved on the periphery of the filter element frame 11. The inner and outer peripheries of the filter medium 12 are filtering sides. Fuel enters the filter element frame 11 from the outside of the filter medium 12 through the filter medium 12, a channel for the fuel to flow between ribs 112, and a water-blocking filter membrane 113 to filter impurities in the fuel and separate water in the fuel. An annular end cover 13 made of a conductive material is connected to one end of the filter medium 12, and a base 14 is connected to the other end of the filter medium. It should be noted that the filter element frame 11 is cylindrical in shape; and correspondingly, the filter medium 12 is set to be cylindrical in shape, of course, it may be set to be of other columnar structures.

An annular raised wall 131 axially extends from an internal opening of the annular end cover 13. It should be noted that the annular raised wall 131 extends towards the inside of the filter element frame 11; conductive portions 132 radially extending inwards are arranged on an inner surface of the annular raised wall 131. The conductive portions 132 are configured to be in hard connection with an external conductive device. The "hard connection" here means that objects in contact with each other has rigidity. When the fuel flows in the filter medium 12, static charge is generated and passes through the filter medium 12, the annular end cover 13, the conductive portions 132, and the external conductive device, thereby releasing the static electricity to the outside.

In the technical solution of the present application, the filter medium 12 is electrically connected to the annular end cover 13 made of the conductive material, the conductive portions 132 are arranged on the annular raised wall 131 of the annular end cover 13, and the conductive portions 132 are in hard contact and electrical connection with the external conductive device. This hard connection can stably enable the conductive portions 132 to be electrically connected to the external conductive device, and the static electricity is conducted out by the external conductive device and dissipated to the outside, such that the static charge generated by the filter medium 12 can be effectively released for a long time during use of the filter element.

Figure 3:
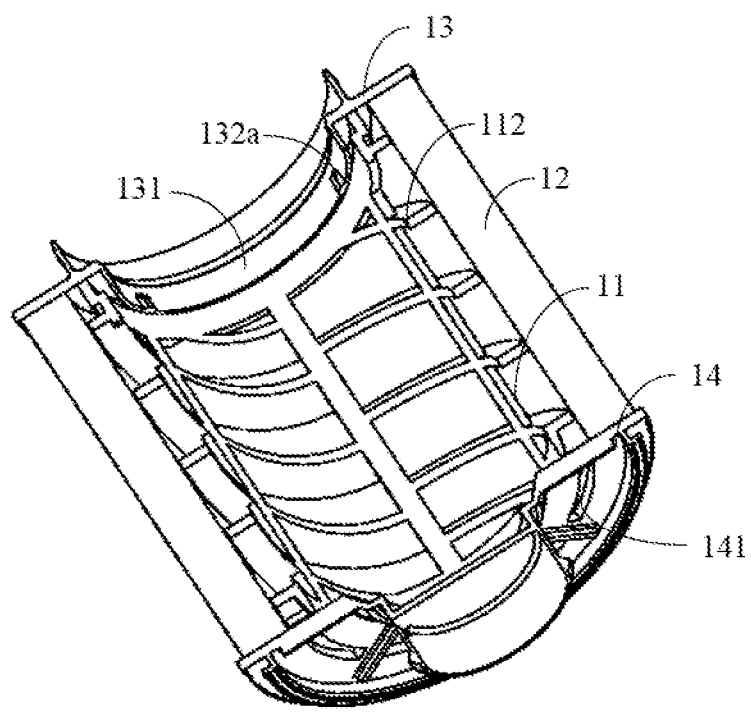
FIG. 3 is an internal structural diagram of an embodiment of the electrostatically conductive filter element provided by the present application.

In some embodiments of the present application, referring to FIG. 3, each of the conductive portions 132 is provided with a contact surface 132a matched with the external conductive device. The contact surface 132a may be a flat surface or a curved surface, and may be adaptively designed according to the shape of the external conductive device, which will not be repeated in detail here.

In an embodiment of the present application, the conductive portion 132 is in interference and close fit with the external conductive device. Through the interference and close fit, a certain tension force may be provided between the conductive portion 132 on the annular raised wall 131 and the external conductive device to prevent bad contact caused by vibration of vehicle running. In addition, the conductive portion 132 and the external conductive device are in surface connection. The surface connection can increase the contact area between the conductive portion and the external conductive device, equivalently, point contact has a more stable contact effect.

Figure 2:
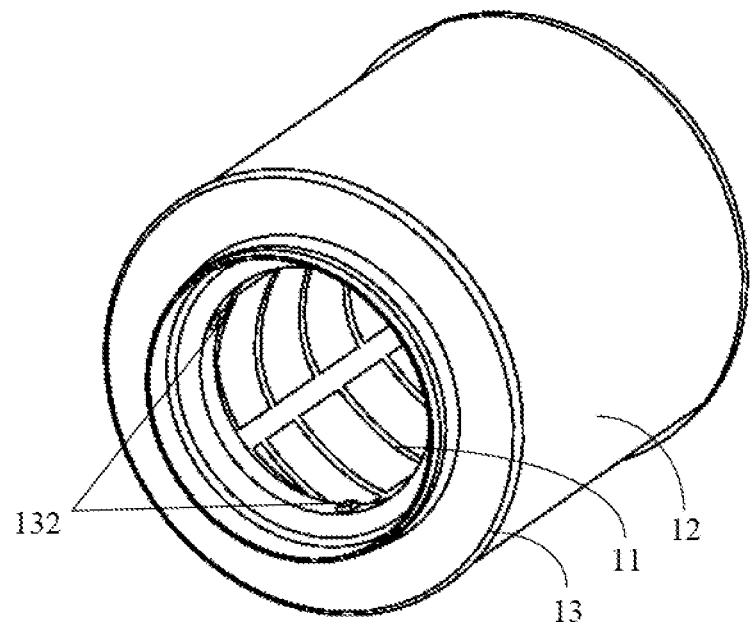
FIG. 2 is a three-dimensional structural diagram of an embodiment of the electrostatically conductive filter element provided by the present application.
Figure 4:
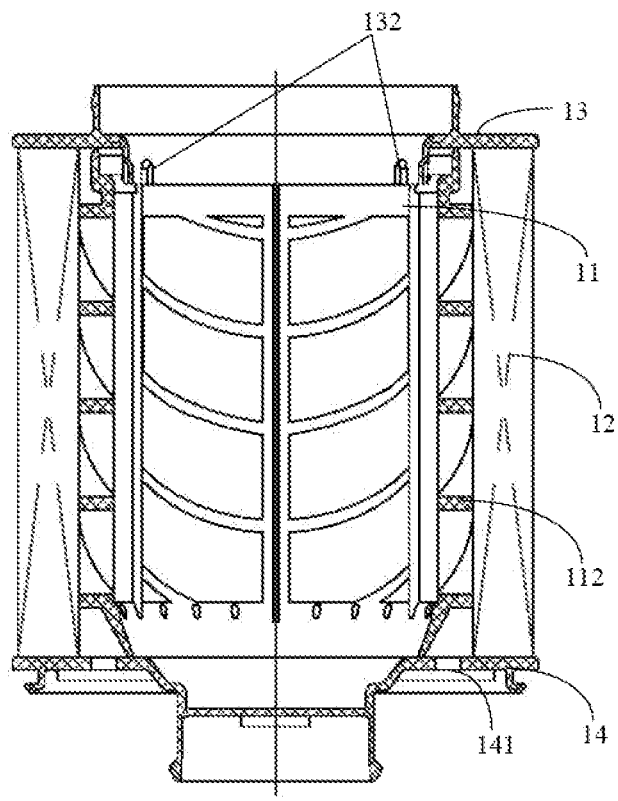
FIG. 4 is a cross-sectional view of an embodiment of the electrostatically conductive filter element provided by the present application.

In some embodiments of the present application, referring to FIGS. 2 and 4, the conductive portion is in a "U" or "V" shape. Specifically, due to the close fit between the conductive portion 132 on the annular raised wall 131 and the external conductive device, a side of the annular raised wall 131 facing the inside of the filter element frame 11, that is, a side of an edge is expanded to a certain extent, and at this time a part of the conductive portion 132 facing the edge of the annular raised wall 131 is less contacted. The part of the "U" or "V"-shaped conductive portion 132 facing the edge of the annular raised wall 131 is relatively small in size, such that the toughness of the conductive portion 132 may be improved, and the service life of the conductive portion 132 is prolonged while the better contact effect is retained. In this embodiment, the conductive portion is in a "U" shape.

In some embodiments of the present application, referring to FIGS. 1 to 4, there are 2, 3, 4, or more conductive portions 132. A plurality of the conductive portions 132 are arranged and may be in full contact with the external conductive device to conduct electricity more stably. In this embodiment, there are three conductive portions 132 evenly distributed on an inner side wall of the annular raised wall 131, the conductive portions 132 are positioned on a same plane, and an angle between every two conductive portions 132 is 120°.

In an embodiment of the present application, referring to FIGS. 1, 3, and 4, the filter element frame 11 is provided with a plurality of helical ribs 112, and a channel for a fluid to flow is provided between the ribs 112. Specifically, referring to FIG. 3, the filter element frame 11 is matched with the filter medium 12, such that a channel is formed between an inner side surface of the filter medium 12 and each of the ribs 112 to facilitate the circulation of filtered fuel.

In an embodiment of the present application, referring to FIG. 1, the filter element frame 11 is provided with the water-blocking filter membrane 113 for separating the water in the fuel, and the water-blocking filter membrane 113 is integrally injection-molded together with the filter element frame 11. The water-blocking filter membrane 113 is securely arranged on the filter element frame 11 by injection molding. Of course, the water-blocking filter membrane 113 is matched in shape with the filter element frame 11. In this embodiment, the water-blocking filter membrane 113 is cylindrical in shape. In addition, it should be noted that the water-blocking filter membrane 113 is an oil-water separation filter membrane and has the functions of oil passing and water blocking. Such material belongs to the prior art and may be purchased in the market.

In an embodiment of the present application, referring to FIGS. 1, 3 and 4, in order to discharge the water blocked by the water-blocking membrane 113, the base 14 is formed with leak holes 141, and the leak holes 141 communicate with the channel between the filter medium 12 and the water-blocking filter membrane 113, that is, the flow channel between the filter medium 12 and the rib 112. The separated water settles under the fuel by gravity and leaks via the leak holes 141 to be collected in a water cavity (not shown in figure).

In an embodiment of the present application, a non-filtering side of the filter medium 12 is sealed, and two end surfaces of the filter medium 12 are integrally welded with the annular end cover 13 and the base 14 by hot melt, respectively.

The present application further provides a fuel filter, including: the electrostatically conductive filter element in any one of the above embodiments; and an external conductive device (not shown in figure), the external conductive device including a housing and a pump device installed in the housing. The electrostatically conductive filter element is installed in the housing, the pump device extends into the inside of a filter element frame, and a surface of the pump device is in hard contact with a conductive portion 132. The pump device is provided with an electrical connector to conduct out static electricity generated in a filter medium by fuel, and the static electricity is released to the outside via a ground wire.

The technical features of the above embodiments may be combined arbitrarily. For the sake of brevity, all possible combinations of the technical features in the above embodiments are not described. However, the combinations of these technical features should be considered to be within the scope of this specification as long as there is no contradiction between them.

The above embodiments only express several implementations of the present application and are described more specifically and in details, but they should not be construed as a limitation to the scope of the patent of the application. It should be pointed out that those of ordinary skill in the art may also make several modifications and improvements without departing from the conception of the present application, and these modifications and improvements fall within the scope of protection of the present application. Therefore, the scope of protection of the patent of the present application should be determined by the appended claims.

What is claimed is:

1. An electrostatically conductive filter element, comprising a filter element frame and a filter medium sleeved on the periphery of the filter element frame, an annular end cover made of a conductive material being connected to one end of the filter medium, and a base being connected to the other end of the filter medium,
    wherein a center of the base at the other end of the filter medium is closed;
    wherein an annular raised wall axially extends from an inner opening of the annular end cover, and conductive portions radially extending inwards and configured to be in hard connection with an external conductive device are arranged on an inner surface of the annular raised wall;
    wherein each of the conductive portions is provided with a contact surface matched with the external conductive device, and the contact surface gradually increases along the extension direction of the annular raised wall;
    wherein the conductive portion and the external conductive device are in interference and close fit and are in surface connection; and
    wherein the conductive portion is in a "U" or "V" shape.

2. The electrostatically conductive filter element according to claim 1, wherein there are at least two conductive portions.

3. The electrostatically conductive filter element according to claim 1, wherein the filter element frame is provided with a plurality of helical ribs, and a channel for a fluid to flow is provided between the ribs.

4. The electrostatically conductive filter element according to claim 1, wherein the filter element frame is provided with a water-blocking filter membrane, and the water-blocking filter membrane is integrally injection-molded together with the filter element frame and configured to separate water in fuel.

5. The electrostatically conductive filter element according to claim 4, wherein the base is formed with leak holes, and the leak holes communicate with a channel between the filter medium and the water-blocking filter membrane to leak separated water.

6. The electrostatically conductive filter element according to claim 1, wherein two end surfaces of the filter medium are integrally welded with the annular end cover and the base, respectively.

7. A fuel filter, comprising:
   the electrostatically conductive filter element according to claim 1; and
   an external conductive device including a housing and a pump device installed in the housing, the electrostatically conductive filter element being arranged in the housing, the pump device being arranged in a filter element frame and being in hard contact with conductive portions, and the pump device being provided with an electrical connector to conduct out the static electricity generated in a filter medium by a fluid.

* * * * *